United States Patent [19]
Wasinger et al.

[11] Patent Number: 5,633,722
[45] Date of Patent: May 27, 1997

[54] SYSTEM FOR COLOR AND SHADE MONITORING OF FABRICS OR GARMENTS DURING PROCESSING

[76] Inventors: Eric M. Wasinger, 16403 Ledge Way, San Antonio, Tex. 78232; Otto Fanini, P.O. Box 773364, Houston, Tex. 77215-3364

[21] Appl. No.: 482,415

[22] Filed: Jun. 8, 1995

[51] Int. Cl.⁶ ........................................ G01J 3/46
[52] U.S. Cl. ............................ 356/402; 250/226
[58] Field of Search .................... 356/402–411; 250/226; 364/526

[56] References Cited

U.S. PATENT DOCUMENTS

| | | | |
|---|---|---|---|
| 4,077,768 | 3/1978 | Johnston et al. | 8/107 |
| 4,590,511 | 5/1986 | Bocchi et al. | 356/402 |

*Primary Examiner*—K. Hantis
*Attorney, Agent, or Firm*—John Lezdey

[57] ABSTRACT

A system for monitoring and controlling the color and shade in a decolorization or fading process for textiles. The system contains a visible light source which illuminates a sample of a dyed textile. A scanner reads the illuminated sample and provides an optical image which is sensed by optical transducers which transforms it into an representative electronic signal which is analyzed for a chroma signal component (image color content) and/or luminance component (image shade/gray scale content). A process control computer monitors and adjusts the process speed and at predetermined color and shade finish stops the decolorization process based on the measured and processed image contents which is tracked by a calibrated and sensed optical image represented by processed electronic signals.

10 Claims, 2 Drawing Sheets

SYSTEM FOR COLOR AND SHADE MONITORING OF FABRICS OR GARMENTS DURING PROCESSING

BACKGROUND OF THE INVENTION

1. Field of the Invention

This invention relates to a system for monitoring and controlling the color and shade in a decoloration or fading process for textiles. More particularly, it relates to a novel system for use in quality control, color grading, shade sorting, color durability testing and the like within a washing machine during an oxidizing or reducing process of the dye on a garment or fabric.

2. Description of the Prior Art

Current fashion trends particularly with denim fabrics and garments dictate a faded and worn look in which the garment fabric becomes softened and more comfortable to wear. Denim is a stiff, durable, twilled fabric of cotton or cotton-blends woven with a colored warp and white filling threads. Usually the colored warp filaments have been dyed with indigo, i.e., a dark blue vat dye. To decolorize the garment and attain the fashionably faded look the garment or fabric is subjected to a process known in the textile art as stonewashing. Earlier prior art stonewashing methods such as disclosed in U.S. Pat. No. 4,575,887 issued to Viramontes involve treatment of denim with abrasives such as pumice stones. U.S. Pat. No. 4,997,450 issued to Olson, et al. gives an overview of these processes including the combination of abrasives and chemical bleaching agents.

In order to obtain the desired decoloration or fading of the denim fabric or garment, control of certain operating parameters are necessary. This is particularly the case with the more complex systems using bleaching agents. For example, the methods using chemical bleaching agents require more control of certain operating parameters, i.e., temperature, processing time, the nature and concentration of the bleaching agent, the nature of the fabric and dye, the pH of the treatment medium, as well as, the type of equipment, load volume, rate of process reaction and other variables.

In commercial stonewashing operations when it is intended that all garments undergo the same degree of decoloration or fading, exact color or shade matching must be reproducible from production run to production run and from plant location to plant location as well. The most common method for this color analysis is visual inspection which relies on the experience skilled operators. However, this method has no universality and is prone to personal errors of judgement resulting in costly inefficiencies and production losses. Under normal lighting conditions, the retina of the human eye has homogeneously distributed points which are primarily sensitive to different colors, i.e., red, green, and blue. The sensitivity to green is the greatest and the sensitivity to blue the least. The trained human eye has a capability of seeing a great number of colors and can discern differences in color shading. However, a difficulty with the human eye is that it cannot accurately determine two dissimilar shades within certain desirable limits due to its limited sensitivity. As mentioned above subjective and personal considerations also come into play.

Various apparatus are known for textile analysis. U.S. Pat. No. 3,999,860 issued to Demsky, et al discloses an apparatus which operates by measuring the reflectance at different wavelengths across the spectrum of visible light. The test sample is illuminated and the light reflected from the sample is detected. However, since the total light reflected includes both specular and diffuse components, and since the specular component gives rise to erroneous analysis these components must be separated. Spectrophotometer equipment is expensive, difficult to set-up and use in a plant environment. Moreover the instrument does not produce output results that are always consistent with the human eye.

Electronic optical image sensors and recorders mimic the function of the eye by sensing and recording an object or image using separate red, green and blue detectors. The optical image received by the optical sensor like in a color video camera for example is broken down to separate basic colors namely red, green and blue by specific optical devices (color separators) such as prisms. The detectors for each separate color may be arranged in a matrix dividing the image into a large number of small picture elements, pels or pixels. The signals from the detectors may be recombined and observed as a colored image, for example, on a cathode ray tube (TV monitor). The signals from the different color detectors may be processed and adjusted electronically so that in effect, the sensitivity of the red, green and blue can be varied. Furthermore, the sensitivities of the red, green and blue detectors may be varied relative to each other to electronically balance a perceived color of an object or image. The balancing of the perceived color provides the electronic image recorders and processors the capability of discerning color grading and shade sorting. However, none of this technology has been applied to monitor color and shade in the decolorization process of textile fabrics or garments.

Thus, the present invention provides a novel system for detecting the decolorization or fading of the fabric or garment, as well as, monitoring and controlling the decolorization process to achieve the desired color or shade.

SUMMARY OF THE INVENTION

The present invention relates to a shade and color analysis system for use in the quality control in a garment decolorization process, especially as a portion of a stonewashing process. The system comprises the steps of loading dyed garments or fabrics into a process vessel equipped with a transparent observation window and rotation means, placing and affixing one or more samples of the fabric or garment to be processed, charging the vessel with treatment chemicals and adjusting operating parameters such as temperature and pH.

Throughout the period of treatment, a constant and fixed light source located outside the process vessel is directed on the fabric or garment sample being processed under predetermined lighting conditions, scanning a viewing area of both samples being processed and reference calibration color/shade standard with a television camera, digitizing the composite output signal of the color television camera to produce a digitized image representative of the components of the color values, preferably the red-green-blue values and a digitized signal representative of the gray scale (shade) to determine if the test sample is within target tolerance limits that are acceptable. The process of the present invention interprets both the color values and the gray scale values compared with comparable target stored values of a standard sample and the process speed is adjusted and ultimately terminated once desired process outputs are reached.

BRIEF DESCRIPTION OF THE DRAWINGS

In the drawings, the like reference numerals identify corresponding parts in each figure.

DETAILED DESCRIPTION OF THE PREFERRED EMBODIMENTS

Figure 1:
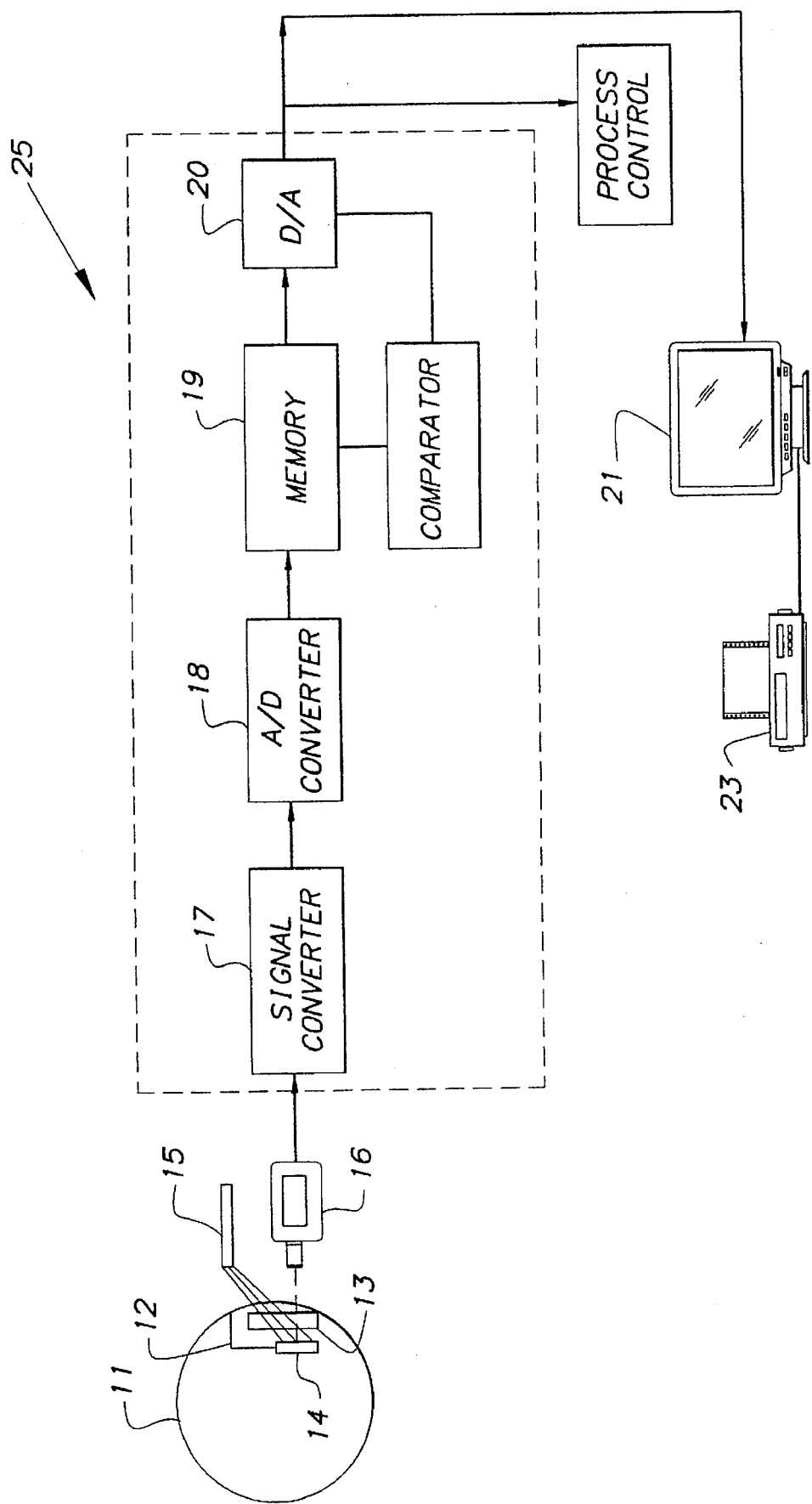
FIG. 1 is a block diagram of a garment color/shade analysis system embodying the present invention.
Figure 2:
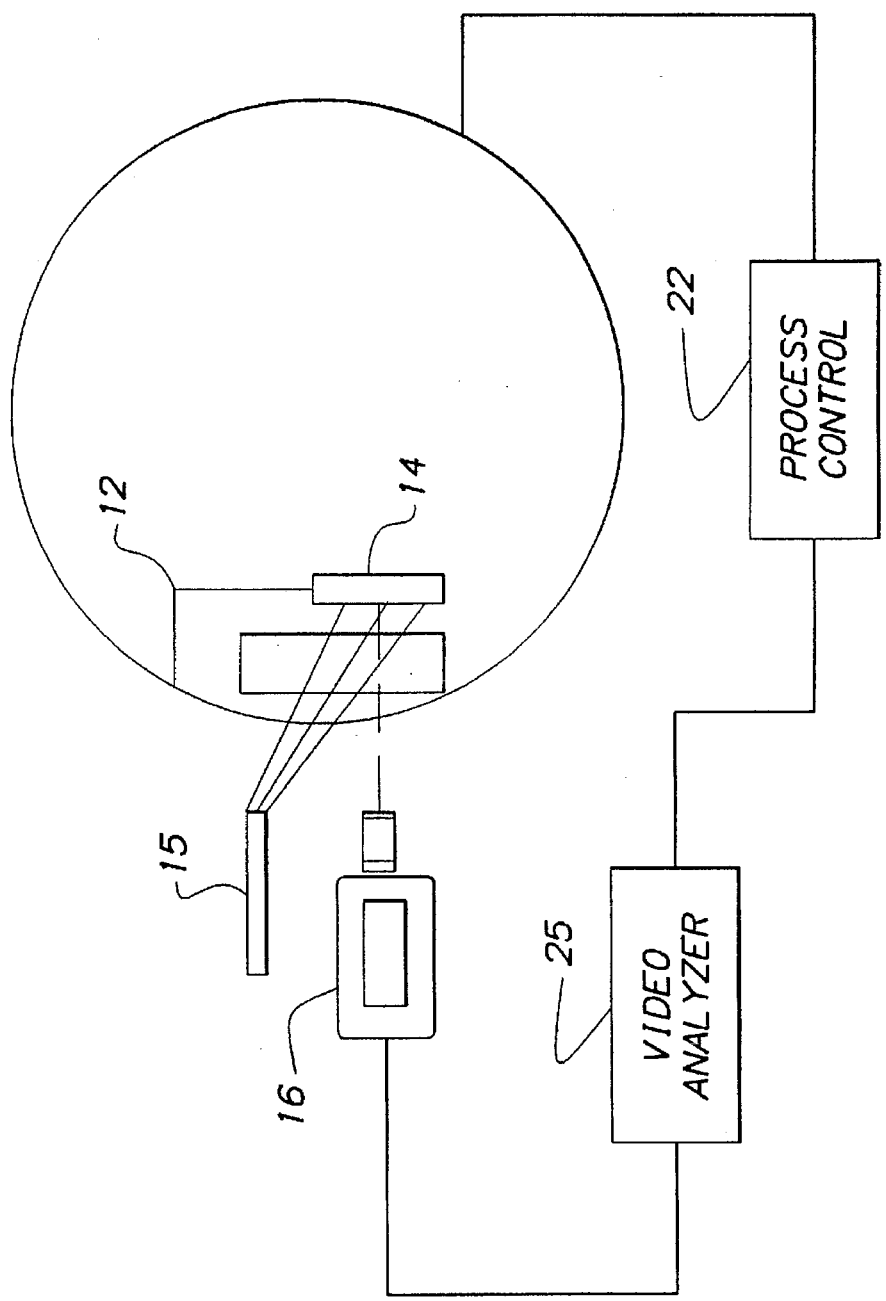
FIG. 2 is a block diagram illustrating in close-up the critical components of the present invention.

Referring to FIG. 1 a color analysis system 10 according to this invention for use in the quality control of a decolorizing process for dyed textiles is shown to comprise a process vessel 11, such as a washing machine having a transparent window 12, in a fixed position, a textile sample or swatch 14, a visible light source 15 beamed through window 12 and on the swatch 14, color television camera 16 which simultaneously scans both swatch and color reference color/shade standard 14, and represent the image with a large number of picture elements or pixels and supplies a composite video signal comprising a chroma component, a luminance component and a carrier component; a signal converter 17 separates the components and then the separate components are digitized by an analog-to-digital (A/D) converter 18, routed to memory computer 19, digitally processed according to certain algorithms and equations producing different outputs converted back to an analog signal by a digital-to-analog (D/A) converter 20 and fed into a process control computer 21 and a monitoring television receiver display 22. A color printout also can be provided by a printer 23 which can be connected to the process control computer as shown or connected to print television receiver monitor screen display 22. Separate indicators can be calculated, processed and displayed in the monitor screen which indicate process speed and percent completion.

Any background errors or undesirable image detection effects included in the viewing region for a sample can be automatically eliminated from the composite signal by adding a shade/color reference and test signals to the camera field of view subjected to similar and lighting conditions which serve as reference samples of the desired color or shade providing in this way the necessary calibration method to obtain necessary process control accuracy.

A decolorization or fading process for dyed textile fabrics or garments monitored, in accordance with the invention by the color analysis system 10 is described with reference to FIG. 1.

A previously decolorized shade/color reference standard simulating a fabric swatch having the desired fabric color or shade with the same moisture content normally present after a decolorization process is placed in the holding means 13 within process vessel 11. The batch reference sample is illuminated under predetermined lighting conditions and the entire swatch surface area is scanned with a color television camera 16 digitizing a video signal output so as to produce a digitized signal representative of the contents of the color values and luminance levels with the carrier component separated which is stored in a video frame grabber for example. The color/shade component values are generated by the television camera 16 on a pixel to pixel basis for any region in the viewing image providing thousands of individual color values for the reference swatch. An important feature of the present invention is that the color/shade values generated by the camera may be stored and analyzed separately in the form of separate color/shade values for each pixel or any group of pixels in the viewing image. The process as implemented by the computer program makes it possible for a single color/shade data in selected area of the batch reference sample to be manipulated and compared as desired to the color/shade data in any area of the shade/color reference standard. Thus, the generated data for each camera image provides the full characteristics and calibration of the color/shade including fine shading distinctions between the shade/color reference standard which could be stored in computer memory and the batch reference sample which both occupy separate regions in each camera image.

Referring again to FIG. 1, after the desired shade of the reference swatch has been digitized and stored in the memory computer as has been discussed above decolorization process, dyed garments are loaded into a process vessel 11. A batch swatch sample 14 of the dyed fabric or garment to be treated placed or affixed in holding means 13 and held in a fixed position inside camera field of view. Water and chemical decolorization agents such as oxidizing agents, i.e., ozone or reducing agents, i.e., sulfites are added and the garments and reaction medium are agitated. The test swatch 14 is subjected to the same reaction conditions as the garments being processed. A visible light source 15 is beamed at swatch 14 through transparent window 12 and the image is picked up by a conventional television camera 16 as an electronic video signal which is decomposed into pixels, then digitized. The composite signal is separated into the chroma component, luminance component and carrier component by the signal converter 17. The separated signals are then processed through an analog-to-digital (A/D) converter 18 for comparison with the information stored in memory computer 19. The stored video information is then provided to digital-to-analog (D/A) processor 20 which includes a comparator, a converter to recombine the signal and processing circuitry so that the video information can be displayed by a monitoring television receiver 21 and fed to a process control 22. When the degree of decolorization of the garments being treated is electronically compared and is consistent with the video information (chroma information and luminance values) provided by the reference swatch coded in the memory computer 19, and the values are within the acceptable limits, the process is automatically stopped. Alternatively, an operator can monitor the television receiver and manually stop the decolorization process when the desired amount of decolorization is reached.

The visible light source 15 is preferably an incandescent or fluorescent light. A conventional television camera 16 is required except that any automatic gain circuitry is disconnected. This is necessary so that the camera can detect differences in the levels of light and illumination.

The signal converter 17 is used to separate the components of the composite video signal from the color television camera 16. The analog-to-digital converter 18 includes process circuitry which processes the component signals provided by the signal converter 17 for storage in a memory computer 19. The memory computer 19 consists of two or more banks of information to store each of the components of video signal separately. The stored video information is then provided to a digital-to-analog processor 20 which includes a digital-to-analog converter and processing circuitry so that the video information can be displayed by a monitoring television receiver 21 and fed to process control 22. When the desired color or shade is reached the process control 22 automatically stops the decolorization process. An image in storage in memory 19 may be stored on tape or other recording medium such as any state-of-the-art video tape recorder. A standard personal computer or comparable machine can be employed for storing and reporting the color analysis data and performing various calculations on data such as the analysis of different areas in the test swatch for color characteristics and the like. The results can be displayed or reported on video monitor 21 or printer 23 that shows the results of the analysis.

EXAMPLE

A decolorizing process in accordance with the present invention is conducted as follows:

Dark blue indigo dyed jeans and water were added to a process vessel. A reducing agent was added at a rate of 1 pound of agent for 2 pounds of fabric. A swatch representative of the jean garments is affixed in the sample holder within the process vessel. An incandescent light is beamed onto the surface of the swatch and the television camera is activated. After thirty minutes the process was automatically terminated. The video monitor was checked and the jeans were decolorized to the desired light blue indigo shade.

Then a decolorant neutralizer was added along with rinsed water. The neutralizing bath is then heated to 120 F. Three individual rinses followed at 140 F. and ending at 120 F. After rinsing was completed, the jeans and the swatch were dried and compared. Each were decolorized to a light blue indigo shade.

It should be obvious that the changes can be made by way of addition and omission to the details and arrangements of parts without departing from the spirit and scope of the invention as defined in the appended claims.

What is claimed:

1. A shade and color analysis system for monitoring color and controlling the introduction of chemical decolorizing agents within a process vessel containing a liquid and an oxidizing or reducing process for decolorizing garments or fabrics in a closed chamber comprising:

means mounted outside said chamber for illuminating swatches or samples within said chamber;

means mounted outside of said chamber for scanning said illuminated swatches or samples including means for providing a composite electronic output signal comprising a luminance signal component, a chroma signal component and a carrier signal component;

means for separating said composite electronic output signal into said luminance signal component and chroma signal component;

means for analyzing said luminance signal component and said chroma signal component;

means for computing color data by comparing said chroma signal component and said luminance signal component with the color data having a tolerance limit stored in a memory means to detect changes in color and shade means for displaying a digitized image representative of the components of color values; and means responsive to said color data for introducing said liquid and said oxidizing or reducing agents into said chamber.

2. The color analysis system of claim 1 wherein said means for illuminating is selected from the group consisting of incandescent and fluorescent sources with known spectrum characteristics.

3. The color analysis system of claim 1 wherein said means for scanning is a television color camera or a black and white camera.

4. The color analysis system of claim 1 wherein the analyzing means analyzes color and shade values.

5. The color analysis system of claim 1 wherein the means for computing color data comprises a digital signal processor and an analog to digital converter.

6. The system of claim 1 wherein the memory means is selected from the group consisting of a personal computer, a video tape recorder, a video frame grabber and video processor device.

7. The system of claim 1 wherein said means responsive to said color data includes a television monitor means.

8. The system of claim 7 wherein said television monitor means includes a color printer.

9. The system of claim 1 wherein said means for computing color data includes control means to adjust process speed and to stop the process when a preselected color or shade value is reached.

10. In combination, a washer having a source of ozone and a color and shade analysis system for monitoring color and controlling the introduction of water and ozone for the decolorization of dyed textiles in said washer, said color system comprising:

a visible light source means mounted outside of said washer for illuminating a swatch or a sample of a dyed textile within said washer;

means for scanning said illuminating swatch or sample said scanning means including means for providing a composite electronic output signal comprising a luminance signal component (shade) and chroma signal component (color);

means for resolving said composite electronic output signal into a luminance signal component (gray scale-shade) and a chroma signal component (color information);

means for analyzing said luminance signal component and a chroma signal component including means for computing color data by comparing the chroma signal stored in a memory means and to detect changes in color and shade; and control means responsive to said color data for controlling the introduction of ozone into said washer.

* * * * *